United States Patent
Jacob et al.

(10) Patent No.: US 10,858,499 B1
(45) Date of Patent: Dec. 8, 2020

(54) SILANE, RUBBER MIXTURE CONTAINING THE SILANE AND VEHICLE TYRE HAVING THE RUBBER MIXTURE IN AT LEAST ONE COMPONENT

(71) Applicant: Continental Reifen Deutschland GmbH, Hannover (DE)

(72) Inventors: Andreas Jacob, Hannover (DE); David-Raphael Dauer, Hannover (DE); Julian Strohmeier, Einbeck (DE); Julia Schoeffel, Hannover (DE); Carla Recker, Hannover (DE); Kirsten Schwekendiek, Wunstorf (DE); Norbert Mueller, Nienhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 16/622,966

(22) PCT Filed: May 14, 2018

(86) PCT No.: PCT/EP2018/062291
§ 371 (c)(1),
(2) Date: Dec. 16, 2019

(87) PCT Pub. No.: WO2019/001822
PCT Pub. Date: Jan. 3, 2019

(30) Foreign Application Priority Data

Jun. 30, 2017 (DE) .................. 10 2017 211 109

(51) Int. Cl.
| | | |
|---|---|---|
| *C07F 7/04* | (2006.01) | |
| *C08K 5/548* | (2006.01) | |
| *B60C 1/00* | (2006.01) | |
| *C08L 21/00* | (2006.01) | |
| *C07F 7/08* | (2006.01) | |

(52) U.S. Cl.
CPC ............... *C08K 5/548* (2013.01); *B60C 1/00* (2013.01); *C07F 7/081* (2013.01); *C08L 21/00* (2013.01)

(58) Field of Classification Search
CPC . C08K 5/548; C08L 21/00; B60C 1/00; C07F 7/081
See application file for complete search history.

(56) References Cited

U.S. PATENT DOCUMENTS

2015/0329573 A1  11/2015  Moser et al.
2017/0073508 A1  3/2017  Schwekendiek et al.

FOREIGN PATENT DOCUMENTS

| EP | 2944640 A1 | 11/2015 |
| JP | 2002201312 A | 7/2002 |
| WO | 2015172915 A1 | 11/2015 |

OTHER PUBLICATIONS

International Search Report dated Jul. 20, 2018 of international application PCT/EP2018/062291 on which this application is based.
Masahiro Fujiwara, Shigeki Terashima, Yasuko Endo u.a. / Switching catalytic reaction conducted in pore void of mesoporous material by redox gate control, No. 44, Jan. 1, 2006, p. 4635.
Chunyu Yang et al. "Fe 3 0 4 mSiO 2 core-shell nanocomposite capped with disulfide gatekeepers for enzyme-sensitive controlled release of anti-cancer drugs", Journal of Materials Chemistry B. vol. 3, No. 6, Jan. 1, 2015, pp. 1010-1019.

*Primary Examiner* — Peter D. Mulcahy
(74) *Attorney, Agent, or Firm* — David L. Cate; Gregory Adams

(57) ABSTRACT

The invention relates to a silane, to a rubber mixture comprising the silane and to a vehicle tire comprising the rubber mixture in at least one component.
The inventive silane has the following formula I)

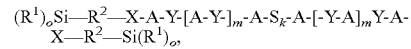

wherein, according to the invention, the silane has spacer groups between the respective silyl groups and the $S_k$ moiety which have at least two aromatic groups A and the linking units X and Y, wherein the groups X within a molecule may be identical or different from each other and are selected from the groups —HNC(═O)—, —C(═O)NH—, —C(═O)O—, —OC(═O)—, —OC(═O)NH—, —HNC(═O)O—, —R³NC(═O)NR³—, —R³NC(═NR³) NR³—, —R³NC(═S)NR³—, wherein at least one R³ within each group X is a hydrogen atom; and wherein the groups Y within a molecule may be identical or different from each other and are selected from the groups —HNC (═O)—, —C(═O)NH—, —C(═O)O—, —OC (═O)—, —OC(═O)NH—, —HNC(═O)O—, —R⁴NC(═O)NR⁴—, —R⁴NC(═NR⁴) NR⁴—, —R⁴NC(═S)NR⁴—, wherein at least one R⁴ within each group Y is a hydrogen atom.
The inventive rubber mixture comprises at least one inventive silane.

12 Claims, No Drawings

SILANE, RUBBER MIXTURE CONTAINING THE SILANE AND VEHICLE TYRE HAVING THE RUBBER MIXTURE IN AT LEAST ONE COMPONENT

The invention relates to a silane, to a rubber mixture comprising the silane and to a vehicle tire comprising the rubber mixture in at least one component.

Silanes are known as additives for rubber mixtures, particularly for vehicle tires, and in particular specifically for rubber mixtures comprising at least one silica as filler. Silanes known from the prior art are disclosed, for example, in DE 2536674 C3 and DE 2255577 C3. The silica in this case is attached to the polymer(s) by means of such silanes, the silanes as a result also being referred to as coupling agents. The attachment of the silica by means of silane coupling agents is advantageous with respect to the rolling resistance characteristics and processability of the rubber mixture. To this end the silane typically has at least one sulfur moiety which takes part in the vulcanization of the rubber mixture.

In addition to the properties mentioned, however, other properties of the rubber mixture also play an important role, especially when being used in vehicle tires, such as in particular the stiffness of the mixture, which affects inter alia the handling characteristics of the vehicle tire.

WO 2015/172915 A1 discloses a rubber mixture comprising a urea-containing silane that has higher stiffness compared to the prior art with virtually unchanged indicators for rolling resistance and wet grip. The urea group is present here in the spacer, that is to say the spacer group between silicon (link to the filler) and sulfur (link to the diene rubber).

JP P2002-201312 A proposes silanes for rubber mixtures that have a urea moiety or an acid amide and a phenyl radical in the spacer group, whereby it would be possible to achieve improved dispersion of carbon black or silica as fillers in the rubber mixture.

It is an object of the present invention to provide a novel silane and to provide a rubber mixture comprising the silane, by means of which a further improvement over the prior art is achieved in the stiffness and hence handling predictors of the rubber mixture, especially for use in vehicle tires.

The object is achieved by the inventive silane as claimed in claim 1, by the inventive rubber mixture comprising the silane and also by the inventive vehicle tire comprising the inventive rubber mixture in at least one component.

The inventive silane has the following formula I):

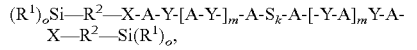

$(R^1)_o$Si—$R^2$—X-A-Y-[A-Y-]$_m$-A-S$_k$-A-[-Y-A]$_m$Y-A-X—$R^2$—Si$(R^1)_o$,  I)

wherein o may be 1, 2 or 3 and k is an integer greater than or equal to 2 and the radicals $R^1$ within the silyl groups $(R^1)_o$Si— and on both sides of the molecule may be identical or different from each other and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides or alkyl polyether groups —O—$(R^6$—O$)_r$—$R^5$ wherein $R^6$ are identical or different and are branched or unbranched, saturated or unsaturated, aliphatic, aromatic or mixed aliphatic/aromatic divalent $C_1$-$C_{30}$ hydrocarbon groups, preferably —$CH_2$—$CH_2$—, r is an integer from 1 to 30, preferably 3 to 10, and $R^5$ are unsubstituted or substituted, branched or unbranched, monovalent alkyl, alkenyl, aryl or aralkyl groups, preferably —$C_{13}H_{27}$ alkyl group or two $R^1$ form a cyclic dialkoxy group having 2 to 10 carbon atoms in which case o is <3, or two or more silanes of formula I) can be bridged via radicals $R^1$; and wherein the radicals $R^2$ within a molecule may be identical or different and contain linear or branched alkyl groups having 1 to 20 carbon atoms or cycloalkyl groups having 4 to 12 carbon atoms or aryl groups having 6 to 20 carbon atoms or alkenyl groups having 2 to 20 carbon atoms, alkynyl groups having 2 to 20 carbon atoms or aralkyl groups having 7 to 20 carbon atoms; and wherein the groups X within a molecule may be identical or different from each other and are selected from the groups —HNC(=O)—, —C(=O)NH—, —C(=O)O—, —OC(=O)—, —OC(=O)NH—, —HNC(=O)O—, —$R^3$NC(=O)N$R^3$—, —$R^3$NC(=N$R^3$)N$R^3$—, —$R^3$NC(=S)N$R^3$—, wherein the radicals $R^3$ within a group X and within a molecule may be identical or different and are selected from a hydrogen atom or as defined for $R^2$ under the condition that at least one $R^3$ within each group X is a hydrogen atom; and wherein the groups A within a molecule may be identical or different from each other and are aromatic groups, and wherein the groups Y within a molecule may be identical or different from each other and are selected from the groups —HNC(=O)—, —C(=O)NH—, —C(=O)O—, —OC(=O)—, —OC(=O)NH—, —HNC(=O)O—, —$R^4$NC(=O)N$R^4$—, —$R^4$NC(=N$R^4$)N$R^4$—, —$R^4$NC(=S)N$R^4$—, wherein the radicals $R^4$ within a group Y and within a molecule may be identical or different and are selected from a hydrogen atom or as defined for $R^2$ under the condition that at least one $R^4$ within each group Y is a hydrogen atom; and wherein each m is independently an integer from 0 to 4, and wherein the silane may also be in the form of oligomers that are formed by hydrolysis and condensation of silanes of formula I).

Compared to the silanes known from the prior art, the inventive silane having the group —$R^2$—X-A-Y-[A-Y-]$_m$-A- has a comparatively long and rigid spacer group which comprises at least two aromatic groups A and the linking units X and Y. The invention thus provides a novel silane. A rubber mixture that comprises the inventive silane surprisingly has a higher, and hence improved, stiffness which could be attributed in particular to the two aromatic groups A present in combination with the linking units X and Y within a spacer group (i.e. on each side of the $S_k$ moiety). The inventive rubber mixture thus has improved handling predictors and the inventive vehicle tire displays improved handling characteristics inter alia.

The inventive silane and preferred embodiments thereof will be explained hereinafter. All aspects also apply to the silane in the inventive rubber mixture and in the inventive vehicle tire.

As shown in formula I), the general basic structure of the silane is symmetric, with the $S_k$ group considered to be the central point. However, individual moieties and parameters on both sides may be different, and so the molecule does not specifically have to be mirror-symmetric.

The moieties and parameters on both sides of the $S_k$ group are preferably identical, which allows a comparatively simple synthesis route.

In formula I), the m on both sides can each independently assume values from 0 to 4. The moiety [A-Y-] can therefore additionally be present in the molecule on each of the two sides or only on one side of the sulfur moiety $S_k$ where m=1, whereby the silane has three aromatic groups A on each side or only on one side, or can repeat on one or both sides independently where m=2 or 3 or 4, with the number of aromatic groups A increasing accordingly. According to one preferred embodiment of the invention, m is 0 on both sides, that is to say preferably each m=0. Such a molecule is comparatively simple to produce, with the presence of the inventive essence of the molecule, namely the two aromatic groups that are then present on each side in combination with the linkages X and Y in the spacer group, so that improved stiffness in the rubber mixture is achieved by this alone.

As stated with regard to formula I), the groups X within a molecule can be identical or different from each other and are selected from the groups —HNC(=O)—, —C(=O)NH—, —C(=O)O—, —OC(=O)—, —OC(=O)NH—, —HNC(=O)O—, —R³NC(=O)NR³—, —R³NC(=NR³)NR³—, —R³NC(=S)NR³—, wherein the radicals R³ within a group X and within a molecule may be identical or different and are selected from a hydrogen atom or as defined for R² under the condition that at least one R³ within each group X is a hydrogen atom.

The groups —HNC(=O)— and —C(=O)NH— are carboxamide groups, with the two different notations being intended to express the possible connectivities within the molecule. It is thus conceivable that the nitrogen atom of group X in the acid amide embodiment links to the aromatic group A or to the radical R².

The groups —C(=O)O— and —OC(=O)— are ester groups, with the two notations here also referring to the different connectivities with respect to A and R², analogously to the acid amide groups.

The groups —OC(=O)NH— and —HNC(=O)O— are urethane groups, with the two notations here also referring to the different connectivities with respect to A and R², analogously to the acid amide groups.

The group —R³NC(=O)NR³— represents a urea group, where at least one of the radicals R³ is a hydrogen atom.

The group —R³NC(=NR³)NR³— represents a guanidine group, where at least one of the radicals R³ is a hydrogen atom.

The group —R³NC(=S)NR³— represents a thiourea group, where at least one of the radicals R³ is a hydrogen atom.

Preferably, each R³ of each group X is a hydrogen atom.

For the case where R³ is an organic radical as defined for R², it is particularly preferable if R³ is selected from alkyl radicals having 1 to 7 carbon atoms or aromatic radicals having 6 to 10 carbon atoms, such as for example a phenyl radical.

It is preferable for the groups X to be selected from the groups —HNC(=O)—, —C(=O)NH—, —OC(=O)NH—, —HNC(=O)O—, —R³NC(=O)NR³—, —R³NC(=NR³)NR³—, —R³NC(=S)NR³—, and specifically using the stipulation given above for R³.

The groups X are particularly preferably selected from the groups —HNC(=O)—, —C(=O)NH—, —OC(=O)NH—, —HNC(=O)O—, —R³NC(=O)NR³—, preferably in turn from the groups —HNC(=O)—, —C(=O)NH—, —R³NC(=O)NR³—.

According to a particularly advantageous embodiment of the invention, X is identical on both sides of the molecule and is a urea group —HNC(=O)NH— where each R³=hydrogen atom.

As stated with regard to formula I), the groups Y within a molecule can be identical or different from each other and are selected from the groups —HNC(=O)—, —C(=O)NH—, —C(=O)O—, —OC(=O)—, —OC(=O)NH—, —HNC(=O)O—, —R⁴NC(=O)NR⁴—, —R⁴NC(=NR⁴)NR⁴—, —R⁴NC(=S)NR⁴—, wherein the radicals R⁴ within a group Y and within a molecule may be identical or different and are selected from a hydrogen atom or as defined for R² under the condition that at least one R⁴ within each group Y is a hydrogen atom.

The statements above with regard to X apply to the respective groups.

Each R⁴ is also preferably a hydrogen atom in the respective groups. For the case where R⁴ is an organic radical as defined for R², it is particularly preferable if R⁴ is selected from alkyl radicals having 1 to 7 carbon atoms or aromatic radicals having 6 to 10 carbon atoms, such as for example a phenyl radical.

It is preferable for the groups Y to be selected from the groups

—HNC(=O)—, —C(=O)NH—, —OC(=O)NH—, —HNC(=O)O—, —R⁴NC(=O)NR⁴—, —R⁴NC(=NR⁴)NR⁴—, —R⁴NC(=S)NR⁴—, and specifically using the stipulation given above for R⁴.

The groups Y are particularly preferably selected from the groups

—HNC(=O)—, —C(=O)NH—, —OC(=O)NH—, —HNC(=O)O—, —R⁴NC(=O)NR⁴—, preferably in turn from the groups —HNC(=O)—, —C(=O)NH—, —R³NC(=O)NR³—.

According to a particularly advantageous embodiment of the invention, Y is identical on both sides of the molecule and is an acid amide group HNC(=O)— or —C(=O)NH—.

Preference is given here to a connectivity that in the simple example where m=0 has the following appearance:

According to this preferred embodiment, the nitrogen atom of the acid amide group on both sides of the molecule is attached to that aromatic group A which links X and Y. This preferred embodiment is not restricted to m=0, but instead is valid for all combinations of the two instances of m having values of 0 to 4.

The aromatic groups A may in principle be any aromatic group, wherein the A within a molecule and on each side of the molecule may be identical or different from each other. The aromatic groups A here can contain heteroatoms and/or bear substituents (for a respective hydrogen atom) on one or more atoms of the aromatic skeleton, specifically in addition to the substituents X, Y and $S_k$ according to the formula.

The aromatic groups A are preferably selected from the group consisting of phenyl, naphthyl, pyridyl, pyridazyl, pyrimidyl, pyrazyl, triazyl, quinolyl, pyrrole, furan, thiophene, pyrazole, imidazole, thiazole and oxazole radicals.

The groups A connect X and Y and also Y and $S_k$ and also Y and Y in the case where m=1 to 4, where X, Y and $S_k$ are in each case formally also substituents of the respective aromatic group A.

The groups mentioned can be linked to the respective aromatic group here via all conceivable atoms of the aromatic skeleton. In a monocyclic aromatic system having six atoms in the skeleton, such as a phenyl radical, this means for example that the groups can be arranged in a para, meta or ortho position relative to each other.

According to a particularly advantageous embodiment of the invention, all A on both sides of the molecule are phenyl radicals.

According to a preferred embodiment of the invention, X and Y and also Y and $S_k$ and also Y and Y in the case of m=1 to 4 are each arranged in para position relative to each other on the respective aromatic group A.

This results in an elongate molecular structure of the silane which especially in a rubber mixture can contribute to a further increase in the stiffness thereof.

According to a further preferred embodiment of the invention, X and Y and also Y and Y in the case of m=1 to 4 are arranged in para position and Y and $S_k$ are each arranged in ortho position relative to each other on the respective aromatic group A.

This results in a rigid molecular structure of the silane which especially in a rubber mixture can contribute to a further increase in the stiffness thereof.

The radicals $R^1$ of the inventive silane may be identical or different from each other within the silyl groups $(R^1)_o Si$— and on both sides of the molecule and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides or alkyl polyether groups —O—$(R^6$—O$)_r$— $R^5$ wherein $R^6$ are identical or different and are branched or unbranched, saturated or unsaturated, aliphatic, aromatic or mixed aliphatic/aromatic divalent C1-$C_{30}$ hydrocarbon groups, preferably —CH$_2$—CH$_2$—, r is an integer from 1 to 30, preferably 3 to 10, and $R^5$ are unsubstituted or substituted, branched or unbranched, monovalent alkyl, alkenyl, aryl or aralkyl groups, preferably —$C_{13}H_{27}$ alkyl group or two $R^1$ form a cyclic dialkoxy group having 2 to 10 carbon atoms wherein o is then <3, or two or more silanes of formula I) can be bridged via radicals $R^1$.

All mentioned radicals $R^1$ and linkages may be combined with each other within a silyl group.

Where two silanes of formula I) are bridged to one other, they share a radical $R^1$. It is also possible for more than two silanes to be linked to one another in this way. Following the synthesis of the silane of formula I), it is therefore conceivable for two silanes of formula I) to be bridged to each other via the radicals $R^1$. It is also possible for more than two silanes to be linked to one another in this way, such as for example via dialkoxy groups. The inventive silane can also comprise oligomers that are formed by hydrolysis and condensation of the silanes of formula I).

The silane of formula I) preferably comprises, in each silyl group $(R^1)_o Si$—, at least one radical $R^1$ that can serve as a leaving group, such as in particular alkoxy groups or any other of the mentioned groups that are bonded to the silicon atom by an oxygen atom, or halides.

The radicals $R^1$ preferably comprise alkyl groups having 1 to 6 carbon atoms or alkoxy groups having 1 to 6 carbon atoms or halides, alkoxy groups having 1 to 6 carbon atoms being particularly preferred.

According to a particularly advantageous embodiment of the invention, the radicals $R^1$ within a silyl group $(R^1)_o Si$— are identical and are alkoxy groups having 1 or 2 carbon atoms, that is to say methoxy groups or ethoxy groups, very particularly preferably ethoxy groups, where o=3.

However, including in the case of oligomers or if two $R^1$ form a dialkoxy group, the remaining radicals $R^1$ are preferably alkyl groups having 1 to 6 carbon atoms or halides or alkoxy groups having 1 to 6 carbon atoms, preferably 1 or 2 carbon atoms, that is to say methoxy groups or ethoxy groups, very particularly preferably ethoxy groups.

The radicals $R^2$ of the inventive silane may be identical or different from each other within a molecule and are linear or branched alkyl groups having 1 to 20 carbon atoms or cycloalkyl groups having 4 to 12 carbon atoms or aryl groups having 6 to 20 carbon atoms or alkenyl groups having 2 to 20 carbon atoms, alkynyl groups having 2 to 20 carbon atoms or aralkyl groups having 7 to 20 carbon atoms.

The radicals $R^2$ are preferably linear or branched alkyl groups having 2 to 8 carbon atoms or cycloalkyl groups having 4 to 8 carbon atoms, such as in particular cyclohexyl radicals. According to a particularly advantageous embodiment of the invention, all radicals $R^2$ within a molecule are identical and are alkyl radicals having 2 to 6 carbon atoms, preferably 2 to 4 carbon atoms, especially preferably 2 or 3 carbon atoms, with propyl radicals having 3 carbon atoms being very particularly preferred.

The moiety $S_k$ is a sulfide bridge composed of k sulfur atoms, with the k sulfur atoms being linked together in a chain so that the molecule has a polysulfidic moiety. The index k here is an integer greater than or equal to 2.

It is preferable for k to be an integer from 2 to 10 (including 2 and 10), particularly preferably 2 to 8, very particularly preferably 2, 3 or 4.

As is known to those skilled in the art, a disulfide moiety that has been obtained as a result of synthesis can be converted into polysulfides by means of sulfurization in a further process step by addition of elemental sulfur, resulting in k greater than or equal to 3, see in this respect Wang et al., Journal of Sulfur Chemistry, 2013, 34, 55-66.

In principle, the sulfurization can also be performed at an earlier stage in the process, such as in particular in the starting molecules in the synthesis, so that the molecule of formula I) can be synthesized as a polysulfide having k greater than or equal to 3.

According to a particularly advantageous embodiment of the invention, k is equal to 2 and as a result the molecule has a disulfidic moiety.

In a particularly preferred and exemplary embodiment of the invention, the inventive silane has the following formula II):

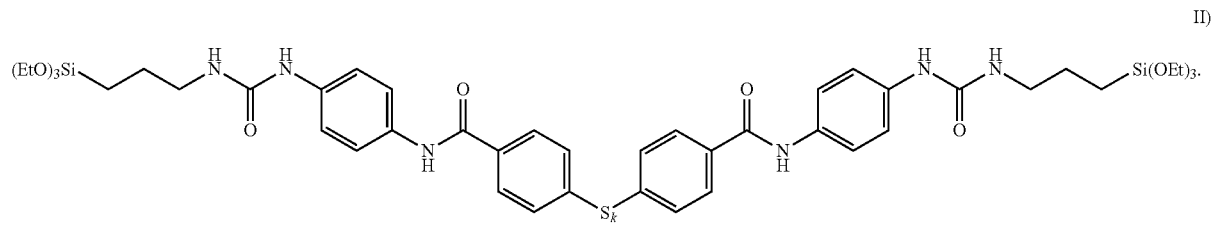

In this case, with regard to formula I), m=0, all instances of R are ethoxy groups, both instances of $R^2$ are propyl radicals, both instances of X are urea groups, all instances of A are phenyl radicals, wherein all linkages are arranged in para position and each instance of Y is an acid amide group the nitrogen atom of which is linked onto the respective phenyl radical in the direction of the urea group (X).

The silane of formula II) represents a preferred inventive example. With it, a particularly high stiffness and low rebound resilience is achieved in the inventive rubber mixture. The latter thus has improved handling and wet braking indicators.

It is particularly preferable for k here to be equal to 2, which results in the aforementioned advantages to a particular degree.

An exemplary and preferred silane where k=2 is shown in formula IV):

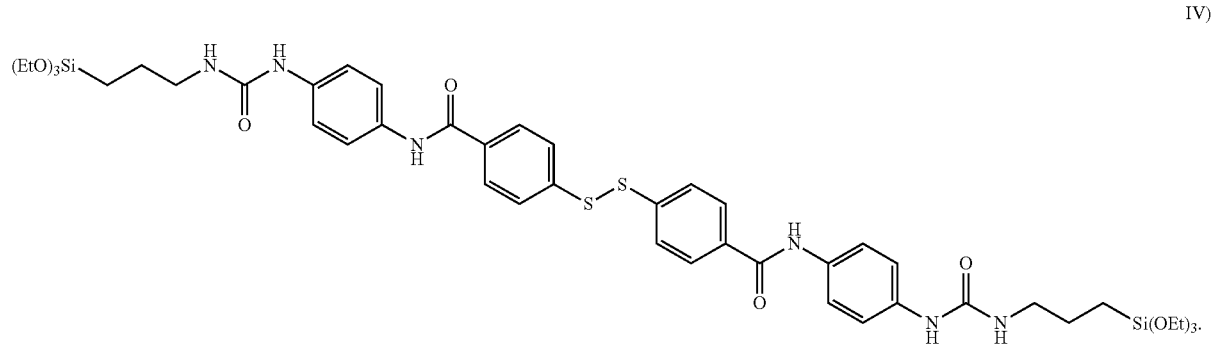

In a further particularly preferred and exemplary embodiment of the invention, the inventive silane has the following formula III):

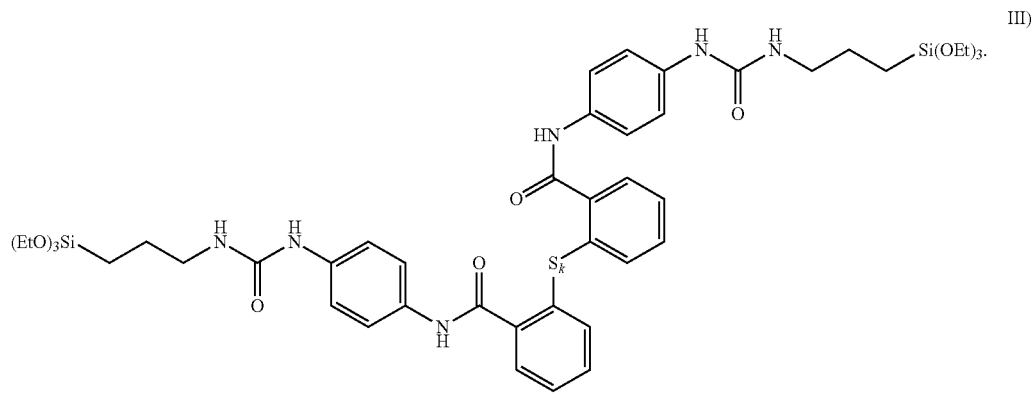

In this case, with regard to formula I), m=0, all instances of $R^1$ are ethoxy groups, both instances of $R^2$ are propyl radicals, both instances of X are urea groups, all instances of A are phenyl radicals, where in contrast to formula II) the $S_k$ group and the respective acid amide group are arranged in ortho position relative to each other on the phenyl radical.

The silane of formula III) represents a preferred inventive example. With it, a particularly high stiffness is achieved in the inventive rubber mixture. The latter thus has improved handling indicators.

It is particularly preferable for k here to be equal to 2, which results in the aforementioned advantages to a particular degree.

An exemplary and preferred silane where k=2 is shown in formula V):

Silanes as are described in WO 2008/083241 A1, WO 2008/083242 A1, WO 2008/083243 A1 and WO 2008/083244 A1 can also be used. Usable silanes are for example those marketed under the NXT name (e.g. 3-(octanoylthio)-1-propyltriethoxysilane) in a number of variants by Momentive, USA, or those marketed under the name VP Si 363® by Evonik Industries.

According to a particularly advantageous embodiment of the invention, the rubber mixture comprises the silane of formula IV).

According to a particularly advantageous embodiment of the invention, the rubber mixture comprises the silane of formula V).

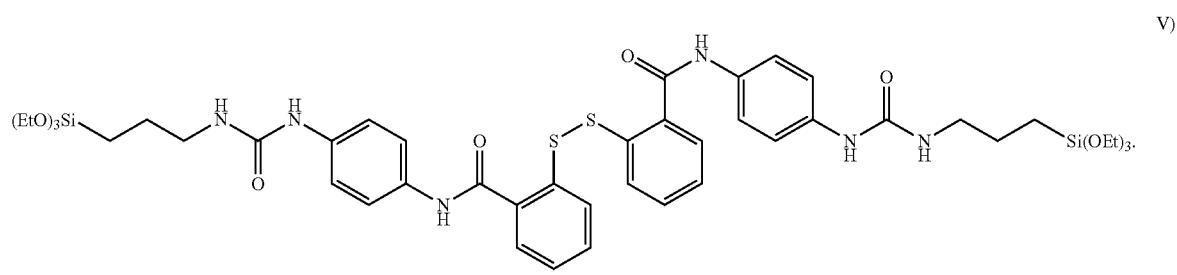

V)

The inventive rubber mixture comprises at least one inventive silane. It is in principle conceivable for the rubber mixture to comprise a mixture of a plurality of inventive silanes from different embodiments, that is to say possibly with different groups X, Z, A, $R^1$, $R^2$ possibly $R^3$, different linkages to the aromatic groups A and also with different values for k and/or m. The rubber mixture can in particular also comprise a mixture of two or more silanes I), II), III), IV) or V). The rubber mixture can also comprise the inventive silane of illustrated formulae I) to V) in combination with other silanes known in the prior art.

Such coupling agents known from the prior art are bifunctional organosilanes which have at least one alkoxy, cycloalkoxy or phenoxy group as a leaving group on the silicon atom and which have, as another functionality, a group which can, possibly after dissociation, enter into a chemical reaction with the double bonds of the polymer. The latter group may for example be the following chemical groups:

—SCN, —SH, —NH₂ or —Sx- (with x=2 to 8).

For example, silane coupling agents used may be 3-mercaptopropyltriethoxysilane, 3-thiocyanatopropyltrimethoxysilane or 3,3'-bis(triethoxysilylpropyl) polysulfides having 2 to 8 sulfur atoms, such as for example 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT can, for example, also be added as a mixture with industrial carbon black (X50S® trade name from Evonik). The prior art also discloses a silane mixture which comprises 40% to 100% by weight of disulfides, particularly preferably 55% to 85% by weight of disulfides and very particularly preferably 60% to 80% by weight of disulfides. Such a mixture is obtainable for example from Evonik under the trade name Si 266® which is described in DE 102006004062 A1 for example.

Blocked mercaptosilanes as known for example from WO 99/09036 may also be used as a silane coupling agent.

The inventive rubber mixture is preferably a rubber mixture that is suitable for use in vehicle tires and for this purpose preferably comprises at least one diene rubber.

"Diene rubbers" refers to rubbers that are formed by polymerization or copolymerization of dienes and/or cycloalkenes and thus have C=C double bonds either in the main chain or in the side groups.

The diene rubber is selected here from the group consisting of natural polyisoprene and/or synthetic polyisoprene and/or epoxidized polyisoprene and/or butadiene rubber and/or butadiene-isoprene rubber and/or solution-polymerized styrene-butadiene rubber and/or emulsion-polymerized styrene-butadiene rubber and/or styrene-isoprene rubber and/or liquid rubbers having a molecular weight $M_w$ of greater than 20 000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or hydrogenated styrene-butadiene rubber.

Nitrile rubber, hydrogenated acrylonitrile-butadiene rubber, chloroprene rubber, butyl rubber, halobutyl rubber or ethylene-propylene-diene rubber in particular are used in the production of technical rubber articles, such as belts, drive belts and hoses, and/or shoe soles.

Preferably, the diene rubber is selected from the group consisting of natural polyisoprene and/or synthetic polyisoprene and/or butadiene rubber and/or solution-polymerized styrene-butadiene rubber and/or emulsion-polymerized styrene-butadiene rubber.

According to a preferred development of the invention, at least two different types of diene rubber are used in the rubber mixture.

The inventive rubber mixture preferably comprises at least one silica as filler, by way of which the advantages of the inventive silane emerge in particular.

The terms "silicic acid" and "silica" are used synonymously in the context of the present invention.

The silicas may be silicas known to those skilled in the art that are suitable as filler for tire rubber mixtures. However, particular preference is given to using a finely divided, precipitated silica which has a nitrogen surface area (BET surface area) (in accordance with DIN ISO 9277 and DIN 66132) of 35 to 400 m$^2$/g, preferably of 35 to 350 m$^2$/g, particularly preferably of 100 to 320 m$^2$/g and very particularly preferably of 100 to 235 m$^2$/g, and a CTAB surface area (in accordance with ASTM D 3765) of 30 to 400 m$^2$/g, preferably of 30 to 330 m$^2$/g, particularly preferably of 95 to 300 m$^2$/g and very particularly preferably of 95 to 200 m$^2$/g.

Such silicas result, for example in rubber mixtures for inner tire components, in particularly good physical properties of the vulcanizates. Advantages in mixture processing by way of a reduction in mixing time can also result here while retaining the same product properties, which lead to improved productivity. Examples of silicas that can thus include not only those of the Ultrasil® VN3 (trade name) type from Evonik but also silicas having a comparatively low BET surface area (such as for example Zeosil® 1115 or Zeosil® 1085 from Solvay) and highly dispersible silicas, so-called HD silicas (for example Zeosil® 1165 MP from Solvay).

The amount of the at least one silica here is preferably 5 to 300 phr, particularly preferably 10 to 200 phr, very particularly preferably 20 to 180 phr. In the case of different silicas, the indicated amounts mean the total amount of silicas present.

The indication "phr" (parts per hundred parts of rubber by weight) used in this document is the conventional indication of quantity for mixture recipes in the rubber industry. The dosage of the parts by weight of the individual substances is based in this document on 100 parts by weight of the total mass of all high molecular weight (Mw greater than 50 000 g/mol) and hence solid rubbers present in the mixture.

The indication "phf" (parts per hundred parts of filler by weight) used in this document is the conventional indication of quantity for coupling agents for fillers in the rubber industry.

In the context of the present application, phf relates to the silica present, meaning that any other fillers present, such as carbon black, are not included in the calculation of the amount of silane.

The inventive rubber mixture preferably comprises at least one silane of formula I), preferably at least the silane of formula IV) and/or formula V) in an amount of from 1 to 25 phr and in the preferred case with silica as filler preferably 2 to 20 phf.

The inventive silane(s) are preferably added during the production of the inventive rubber mixture in at least one base-mixing stage which preferably comprises at least one diene rubber and preferably at least one silica as filler.

The present invention thus further provides a process for producing the inventive rubber mixture, wherein at least one inventive silane as described above is added preferably in at least one base-mixing stage.

According to an advantageous embodiment of the invention, the at least one inventive silane is adsorbed onto silica beforehand and in this form is mixed into the rubber mixture. In the inventive process for production of the inventive rubber mixture, it is therefore preferable if the at least one inventive silane is adsorbed onto silica beforehand and in this form is mixed into the rubber mixture.

The rubber base mixture thus obtained and comprising at least one inventive silane is subsequently processed to give a finished rubber mixture by adding vulcanization chemicals, see below in particular a sulfur vulcanization system, and then vulcanized, to obtain an inventive vulcanizate of the inventive rubber mixture.

The inventive rubber mixture can comprise carbon black as a further filler, specifically preferably in amounts of 2 to 200 phr, particularly preferably 2 to 70 phr.

Further, optionally reinforcing, fillers are for example carbon nanotubes ((CNTs), including discrete CNTs, so-called hollow carbon fibers (HCF) and modified CNTs containing one or more functional groups such as hydroxy, carboxy and carbonyl groups), graphite and graphene and what is known as "carbon-silica dual-phase filler".

The inventive rubber mixture may comprise further fillers.

The amount of further fillers according to one embodiment of the invention is 0.1 to 3 phr. According to a further embodiment, the amount of further fillers is 0 phr.

According to a further embodiment of the invention, the amount of further fillers is 0.1 to 50 phr, preferably 0.1 to 30 phr, particularly preferably 0.1 to 10 phr.

Within the context of the present invention, the further (non-reinforcing) fillers include aluminosilicates, kaolin, chalk, starch, magnesium oxide, titanium dioxide, or rubber gels and also fibers (such as for example aramid fibers, glass fibers, carbon fibers, cellulose fibers).

Within the context of the present invention, zinc oxide is not included among the fillers.

The rubber mixture can furthermore comprise customary additives in customary parts by weight which during the production of said mixture are added preferably in at least one base-mixing stage. These additives include a) aging stabilizers, such as for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ), b) activators, such as for example zinc oxide and fatty acids (e.g. stearic acid) and/or other activators, such as for example zinc complexes, for example zinc ethylhexanoate, c) antiozonant waxes, d) resins, especially tackifying resins for inner tire components, which do not correspond to the hydrocarbon resins mentioned as preferable above, e) masticating aids, such as for example 2,2'-dibenzamidodiphenyl disulfide (DBD) and f) processing aids, such as in particular fatty acid esters and metal soaps, such as for example zinc soaps and/or calcium soaps, g) plasticizers, such as in particular aromatic, naphthenic or paraffinic mineral oil plasticizers, such as for example MES (mild extraction solvate) or RAE (residual aromatic extract) or TDAE (treated distillate aromatic extract), or rubber-to-liquid (RTL) oils or biomass-to-liquid (BTL) oils, preferably having a content of polycyclic aromatics of less than 3% by weight according to method IP 346 or rapeseed oil or factices or liquid polymers, the average molecular weight of which (determination by GPC=gel permeation chromatography, using a method based on BS ISO 11344: 2004) is between 500 and 20 000 g/mol, with mineral oils being particularly preferred as plasticizers.

When using mineral oil, this is preferably selected from the group consisting of DAE (distilled aromatic extracts) and/or RAE (residual aromatic extract) and/or TDAE (treated distillate aromatic extracts) and/or MES (mild extracted solvents) and/or naphthenic oils.

The proportion of the total amount of further additives is 3 to 150 phr, preferably 3 to 100 phr and particularly preferably 5 to 80 phr.

Zinc oxide (ZnO) may be included in the total proportion of further additives in the abovementioned amounts. This may be any type of zinc oxide known to those skilled in the art, such as for example ZnO granules or powder. The zinc oxide conventionally used generally has a BET surface area of less than 10 m$^2$/g. However, it is also possible to use a zinc oxide having a BET surface area of 10 to 100 m$^2$/g, such as for example what are known as "nano zinc oxides".

The vulcanization of the inventive rubber mixture is preferably conducted in the presence of sulfur and/or sulfur donors with the aid of vulcanization accelerators, it being possible for some vulcanization accelerators to act simultaneously as sulfur donors. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators. Preference is given to using a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS) or a guanidine accelerator such as diphenylguanidine (DPG).

The sulfur donor substances used may be any sulfur-donating substances known to those skilled in the art. If the rubber mixture comprises a sulfur-donating substance, the latter is preferably selected from the group comprising for example thiuram disulfides, such as for example tetrabenzylthiuram disulfide (TBzTD) and/or tetramethylthiuram disulfide (TMTD) and/or tetraethylthiuram disulfide (TETD) and/or thiuram tetrasulfides, such as for example dipentamethylenethiuram tetrasulfide (DPTT), and/or dithiophosphates, such as for example DipDis (bis(diisopropyl) thiophosphoryl disulfide) and/or bis(O,O-2-ethylhexylthiophosphoryl) polysulfide (e.g. Rhenocure SDT 50®, Rheinchemie GmbH) and/or zinc dichloryldithiophosphate (e.g. Rhenocure ZDT/S®, Rheinchemie GmbH) and/or zinc alkyldithiophosphate, and/or 1,6-bis(N,N-dibenzylthiocarbamoyldithio)hexane and/or diaryl polysulfides and/or dialkyl polysulfides.

Further network-forming systems, such as can be obtained for example under the trade names Vulkuren®, Duralink® or Perkalink®, or network-forming systems, such as are described in WO 2010/049216 A2, can also be used in the rubber mixture. This system contains a vulcanizing agent which crosslinks with a functionality of greater than four and at least one vulcanization accelerator.

It is particularly preferable to use the accelerators TBBS and/or CBS and/or diphenylguanidine (DPG).

Vulcanization retarders can also be present in the rubber mixture.

The terms "vulcanized" and "crosslinked" are used synonymously within the context of the present invention.

According to a preferred development of the invention, a plurality of accelerators are added in the final mixing stage during the production of the sulfur-crosslinkable rubber mixture.

The inventive sulfur-crosslinkable rubber mixture is produced by the process that is customary in the rubber industry, in which in one or more mixing stages a base mixture comprising all constituents except for the vulcanization system (sulfur and vulcanization-influencing substances) is firstly produced. The finished mixture is produced by adding the vulcanization system in a final mixing stage. The finished mixture is for example processed further and brought into the appropriate shape by means of an extrusion procedure or calendering.

This is followed by further processing by vulcanization, wherein sulfur crosslinking takes place due to the vulcanization system added within the context of the present invention.

The above-described inventive rubber mixture is particularly suitable for use in vehicle tires, especially pneumatic vehicle tires. Application in all tire components is in principle conceivable here, in particular in a tread, especially in the cap of a tread of cap/base construction.

The cap here is the part of the tread of the vehicle tire that comes into contact with the driving surface, while the base is the inner part of the tread that that is located radially beneath the cap and does not come into contact with the driving surface.

For use in vehicle tires, the mixture, as a finished mixture prior to vulcanization, is preferably brought into the shape of a tread and is applied in the known manner during production of the green vehicle tire. The production of the inventive rubber mixture, for use as a sidewall or other body mixture in vehicle tires, is effected as has already been described. The difference lies in the shaping after the extrusion procedure/the calendering of the mixture. The shapes thus obtained of the as-yet unvulcanized rubber mixture for one or more different body mixtures then serve for the construction of a green tire. "Body mixture" refers here to the rubber mixtures for the inner components of a tire, such as essentially squeegee, inner liner (inner layer), core profile, belt, shoulder, belt profile, carcass, bead reinforcement, bead profile, flange profile and bandage. The as-yet unvulcanized green tire is subsequently vulcanized.

For use of the inventive rubber mixture in drive belts and other belts, especially in conveyor belts, the extruded, as-yet unvulcanized mixture is brought into the appropriate shape and often provided at the same time or subsequently with strength members, for example synthetic fibers or steel cords. This usually affords a multilayer construction consisting of one and/or more plies of rubber mixture, one and/or more plies of identical and/or different strength members and one and/or more further plies of the same and/or another rubber mixture.

The present invention further provides a vehicle tire comprising the inventive rubber mixture comprising at least one inventive silane in at least one component.

The vulcanized vehicle tire in at least one component comprises a vulcanizate of at least one inventive rubber mixture. It is known to those skilled in the art that most substances, such as for example those containing rubbers and silanes, in particular the inventive silane, are present in chemically modified form either already after mixing or only after vulcanization.

Within the context of the present invention, "vehicle tires" are to be understood to mean pneumatic vehicle tires and solid rubber tires, including tires for industrial and construction site vehicles, truck, car and two-wheeled-vehicle tires.

The inventive vehicle tire preferably comprises the inventive rubber mixture at least in the tread. The inventive vehicle tire preferably comprises the inventive rubber mixture at least in the sidewall. The inventive rubber mixture is further also suitable for other components of vehicle tires, such as for example in particular the flange profile, and also for inner tire components. The inventive rubber mixture is further also suitable for other technical rubber articles, such as bellows, conveyor belts, air springs, belts, drive belts or hoses, and also footwear soles.

The invention shall be explained in more detail below with reference to exemplary embodiments.

The silane of formula IV), as an example of the invention, was prepared in the following way:

1. Preparation of Bis(4-Carboxyphenyl) Disulfide According to the Synthesis Scheme of Formula VI)

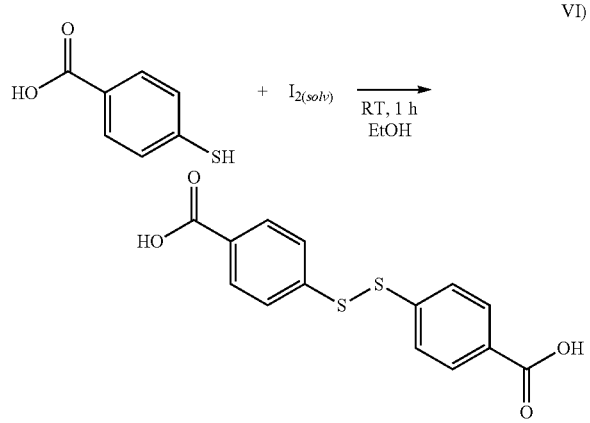

A saturated ethanolic iodine solution (25 ml in total) was added dropwise at room temperature to a solution of 4-mercaptobenzoic acid (7.50 g, 48.6 mmol, 1.0 eq.) in ethanol (500 ml, EtOH). On addition, the iodine solution decolorized and the reaction mixture became cloudy. The addition of iodine was continued until the resulting suspension acquired a pale yellow color due to excess iodine.

The reaction mixture was then filtered using a Buchner funnel and the residue was washed with cold demineralized water (4×50 ml) and cold ethanol (4×50 ml) to remove the excess iodine.

After drying under high vacuum, the target compound was isolated in the form of a white powder (6.69 g, 21.8 mmol, 90%).

$^1$H NMR (500 MHz, DMSO-$d_6$; Dimethyl sulfoxide) δ 13.08 (s, 2H), 7.97-7.88 (m, 4H), 7.67-7.59 (m, 4H).

$^{13}$C NMR (126 MHz, DMSO-$d_6$) δ 167.22, 141.16, 130.83, 130.31, 126.54.

2. Preparation of 1-(4'-Aminophenyl)-3-(3"-(Triethoxysilyl)Propyl)Urea According to the Synthesis Scheme of Formula VII)

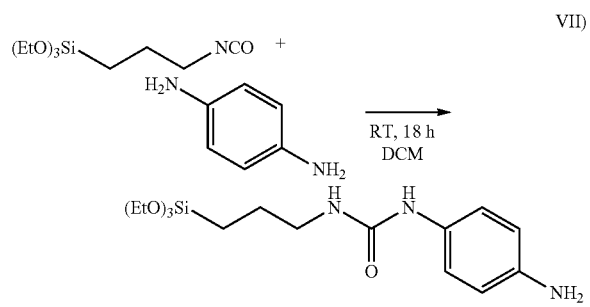

3-(Isocyanatopropyl)triethoxysilane (11.44 ml, 11.44 g, 46.2 mmol, 1.0 eq.) was added dropwise at room temperature to a solution of para-phenylenediamine (10.00 g, 92.5 mmol, 2.0 eq.) in dichloromethane (300 ml of DCM). After stirring overnight, the solvent was removed on a rotary evaporator, affording a gray solid (21.57 g) as the crude product.

Purification by column chromatography was performed in a plurality of small portions of approx. 3-4 g each (approx. 74% by weight yield in each case) on silica gel (DCM/EtOH 9:1).

After drying under high vacuum, the target compound was isolated in the form of a light gray powder (extrapolated for the total product: 15.96 g, 44.9 mmol, 97% based on silane).

$^1$H NMR (500 MHz, DMSO-$d_6$) δ 7.82 (s, 1H), 6.98 (d, J=8.7 Hz, 2H), 6.45 (d, J=8.7 Hz, 2H), 5.91 (t, J=5.8 Hz, 1H), 4.66 (s, 2H), 3.74 (q, J=7.0 Hz, 6H), 3.00 (q, J=6.8 Hz, 2H), 1.48-1.39 (m, 2H), 1.14 (t, J=7.0 Hz, 9H), 0.57-0.49 (m, 2H).

$^{13}$C NMR (126 MHz, DMSO-$d_6$) δ 155.69, 143.33, 129.62, 120.22, 114.12, 57.70, 41.81, 23.49, 18.24, 7.25.

3. Preparation of Bis(4-Carboxylchloridophenyl) Disulfide (In Situ) According to the Synthesis Scheme of Formula VIII)

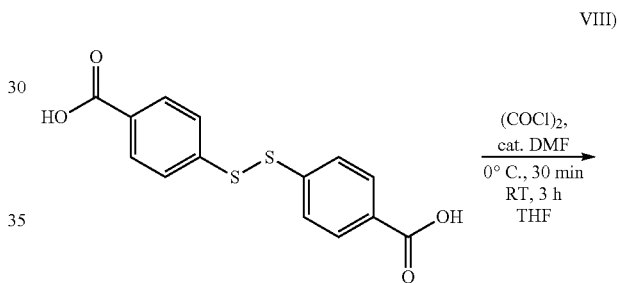

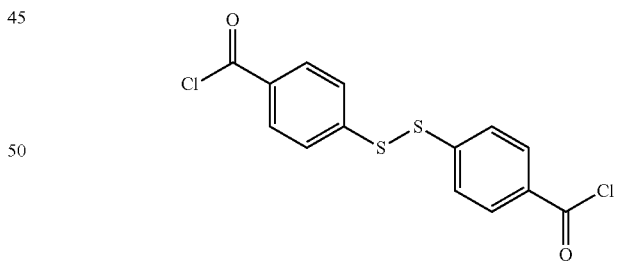

Dimethylformamide (0.1 ml of DMF, cat.) was added to a suspension of bis(4-carboxyphenyl) disulfide (1.96 g, 6.4 mmol, 1.0 eq.) in tetrahydrofuran (60 ml of THF). Oxalyl chloride (5.49 ml, 8.12 g, 64.0 mmol, 10.0 eq.) was added dropwise to the reaction mixture at 0° C. and the mixture was stirred at this temperature for 30 min. The resulting yellow solution was then stirred for a further 3 h at RT. The solvent and excess oxalyl chloride were then distilled off. A yellow solid was isolated that was used for the next synthesis step without further analysis or purification (on account of its reactivity).

4. Preparation of the Silane of Formula II) According to the Synthesis Scheme of Formula IX)

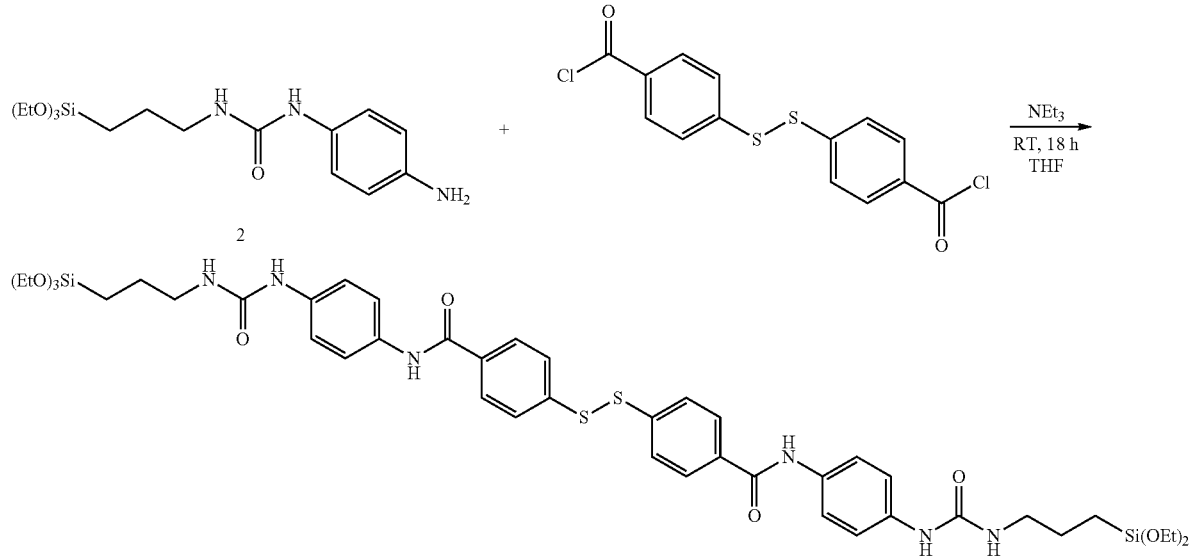

A solution of bis(4-carboxylchloridophenyl) disulfide (1.12 g, 3.26 mmol, 1.0 eq.) in THF (40 ml) was added dropwise at RT, over a period of 15 min, to a solution of 1-(4-aminophenyl)-3-(3-(triethoxysilyl)propyl)urea (2.55 g, 7.17 mmol, 2.2 eq.) and triethylamine (2.11 ml, 1.65 g, 16.3 mmol, 5.0 eq.) in THF (10 ml). The resulting pale yellow suspension was subsequently stirred overnight and then filtered. The filter cake was washed with cold THF (2×10 ml). After drying under high vacuum, the target compound was isolated in the form of a white powder (2.39 g, 2.44 mmol, 75%).

$^1$H NMR (500 MHz, DMSO-d$_6$) δ 10.13 (s, 2H), 8.45 (s, 2H), 7.94 (d, J=8.5 Hz, 4H), 7.67 (d, J=8.6 Hz, 4H), 7.56 (d, J=9.0 Hz, 4H), 7.34 (d, J=9.0 Hz, 4H), 6.23 (t, J=5.8 Hz, 2H), 3.74 (q, J=7.0 Hz, 12H), 3.03 (q, J=6.6 Hz, 4H), 1.52-1.41 (m, 4H), 1.14 (t, J=7.0 Hz, 18H), 0.60-0.51 (m, 4H).

$^{13}$C NMR (126 MHz, DMSO-d$_6$) δ 164.32, 155.34, 139.05, 136.78, 134.16, 132.49, 128.75, 126.38, 121.10, 117.79, 57.80, 56.12, 41.84, 23.45, 18.31, 7.32.

$^{29}$Si NMR (99 MHz, DMSO-d$_6$) δ −44.52.

The preparation of the silane V) as a further example of the invention, that is to say preparation of the silane possessing an ortho-linked disulfidic group, is effected in principle analogously to the preparation of silane IV). Therefore, only the differences are described hereafter.

The synthesis proceeds from the commercially available bis(2-carboxyphenyl) disulfide, which is converted to bis(2-carboxylchloridophenyl) disulfide by means of oxalyl chloride according to scheme X):

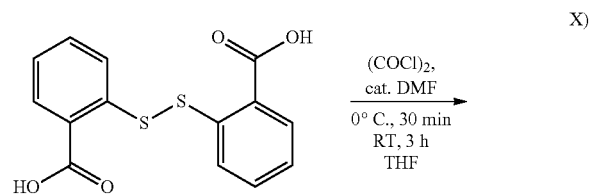

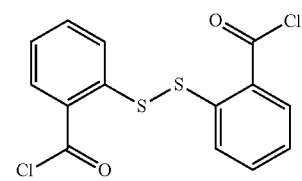

DMF (0.15 ml, cat.) was added to a suspension of bis(2-carboxyphenyl) disulfide (2.94 g, 9.6 mmol, 1.0 eq.) in THF (60 ml). Oxalyl chloride (8.23 ml, 12.19 g, 96.0 mmol, 10.0 eq.) was added dropwise to the reaction mixture at 0° C. and the mixture was stirred at this temperature for 30 min. The resulting yellow solution was then stirred at RT for a further 3 h. The solvent and excess oxalyl chloride were then distilled off.

A yellow solid was isolated that was used for the next synthesis step without further analysis or purification (on account of its reactivity).

This was followed, according to synthesis scheme XI), by reaction with 1-(4-aminophenyl)-3-(3-(triethoxysilyl)propyl)urea, which is prepared as described above.

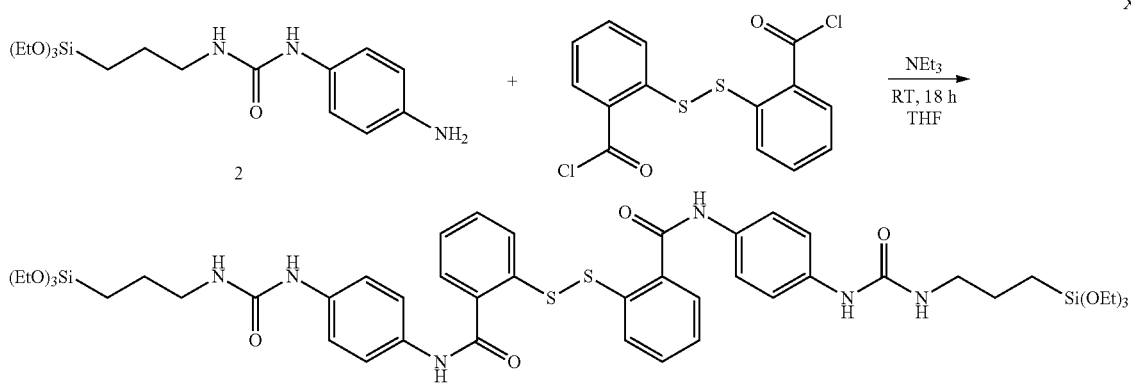

A solution of bis(2-carboxylchloridophenyl) disulfide (3.30 g, 9.6 mmol, 1.0 eq.) in THF (80 ml) was added dropwise at RT, over a period of 15 min, to a solution of 1-(4-aminophenyl)-3-(3-(triethoxysilyl)propyl)urea (7.51 g, 21.1 mmol, 2.2 eq.) and triethylamine (6.65 ml, 4.86 g, 48.0 mmol, 5.0 eq.) in THF (30 ml). The resulting pale yellow suspension was subsequently stirred overnight and then filtered. The filtrate was concentrated and the further solid that precipitated out was filtered off again. The filter cake was washed with cold THF (2×25 ml) and demineralized water (2×25 ml). After drying under high vacuum, the target compound was isolated in the form of a white powder (2.70 g, 2.75 mmol, 29%).

$^1$H NMR (500 MHz, DMSO-$d_6$) δ 10.41 (s, 2H), 8.39 (s, 2H), 7.76 (d, J=7.6 Hz, 1H), 7.72 (d, J=8.1 Hz, 1H), 7.60 (d, J=9.0 Hz, 3H), 7.50 (ddd, J=8.5, 7.4, 1.5 Hz, 2H), 7.40-7.34 (m, 6H), 6.14 (t, J=5.7 Hz, 2H), 3.75 (q, J=7.0 Hz, 12H), 3.05 (q, J=6.6 Hz, 4H), 1.54-1.42 (m, 4H), 1.15 (t, J=7.0 Hz, 18H), 0.63-0.51 (m, 4H).

$^{13}$C NMR (126 MHz, DMSO-$d_6$) δ 165.20, 155.21, 136.85, 136.49, 134.67, 132.32, 131.30, 128.37, 126.25, 126.09, 120.76, 117.77, 57.73, 41.77, 23.39, 18.25, 7.27.

$^{29}$Si NMR (99 MHz, DMSO-$d_6$) δ −44.57.

The prepared silane of formula IV) and/or V) is mixed into an inventive rubber mixture comprising at least one diene rubber and at least one silica as filler. To this end, the silane of formula IV) and/or V) is preferably adsorbed onto a silica beforehand and subsequently added in this form to the rubber mixture.

Adsorption onto silica is carried out, for example, as follows:

To a suspension of silica, for example granulated silica, in DMF is added, at room temperature, a solution of the silane of formula IV) and/or V) dissolved in DMF in the desired silica/silane ratio. For example, 31.2 g of silica (VN3, Evonik) and 4.62 g of the silane of formula IV) and/or V) are used. The resulting suspension is stirred overnight at 120° C. and the solvent is subsequently removed under reduced pressure. After drying for one day under high vacuum at 40° C., the modified silica thus obtained is comminuted by means of a mortar. It is then dried under high vacuum for a further day at 40° C.

The inventive rubber mixture is by way of example applied in the form of a preformed tread of a vehicle tire (as described above) to a green tire and subsequently vulcanized with the latter.

Exemplary inventive rubber mixtures comprising the silanes of formula IV) or V) are described hereafter and compared with rubber mixtures comprising a silane known from the prior art. The compositions and results are summarized in table 1. The comparative mixtures are identified with a C, the inventive mixtures with an I. The mixtures C1 and I1, and C2 and I2, and C3 and I3 and I4 in each case contain equal molar amounts of the silane from the prior art (C1, C2, C3) or of the inventive silane IV) (I1,I2,I3) or of the inventive silane V) (I4).

The silanes are in each case adsorbed onto the silica (95 phr in each mixture) so that the respectively silane-modified silica was mixed in. The amounts indicated thus refer to the products of the modification reactions, with 95 phr of silica being used in each mixture.

The remaining amount (difference: table value minus 95 phr) thus represents silane bound to the silica.

The mixtures were otherwise produced by the process customary in the rubber industry under standard conditions in two stages in a laboratory mixer with a volume of 80 milliliters to 3 liters, in which, in the first mixing stage (base-mixing stage), all constituents apart from the vulcanization system (sulfur and vulcanization-influencing substances) were first mixed at 145 to 165° C., with target temperatures of 152 to 157° C., for 200 to 600 seconds. By adding the vulcanization system in the second stage (final mixing stage), the finished mixture was produced, with mixing at 90 to 120° C. for 180 to 300 seconds.

All the mixtures were used to produce test specimens by vulcanization to t95 (measured on a moving disk rheometer to ASTM D 5289-12/ISO 6502) under pressure at 160° C., and these test specimens were used to determine material properties that are typical in the rubber industry by the test methods specified hereinafter.

Shore A hardness (Sh A) at room temperature according to ISO 868

Rebound resilience at room temperature according to ISO 4662

Dynamic storage modulus E' at 55° C. according to DIN 53 513 at 0.15% and 6% elongation Stress value at 50%, 100%, 200%, 300% and 400% elongation at room temperature according to ISO 37, test specimen type 3 dumbbell Substances Used:
a) Silica: Ultrasil® VN3, Evonik, in each case 95 phr, remaining amount in each case bound silane
b) TESPD (3,3'-bis(triethoxysilylpropyl) disulfide)
c) Inventive silane of formula IV), prepared as described above d) Inventive silane of formula V), prepared as described above
e) Aging stabilizers, antiozonant wax, zinc oxide, stearic acid
f) DPG and CBS.

As can be seen in table 1, the rubber mixtures I1 to I4 have a higher level of stiffness and have a higher hardness. The exemplary embodiments according to the invention, that is to say the mixtures comprising the silanes prepared according to the invention, thus in particular display improved handling indicators.

The inventive examples I1 to I3 comprising the silane according to formula IV) additionally have, with the lower rebound resiliences (compared to C1 to C3), improved wet braking indicators.

TABLE 1

| Constituents | Unit | C1 | C2 | C3 | I1 | I2 | I3 | I4 |
|---|---|---|---|---|---|---|---|---|
| NR | phr | 20 | 20 | 20 | 20 | 20 | 20 | 20 |
| SSBR | phr | 80 | 80 | 80 | 80 | 80 | 80 | 80 |
| TDAE | phr | 35 | 35 | 35 | 35 | 35 | 35 | 35 |
| Silica$^{a)}$ + TESPD$^{b)}$ | phr | 98.4 | 99.4 | 100.5 | — | — | — | — |
| Silica$^{a)}$ + silane IV)$^{c)}$ | phr | — | — | — | 102.7 | 105.2 | 107.8 | — |
| Silica$^{a)}$ + silane V)$^{d)}$ | phr | — | — | — | — | — | — | 107.8 |
| Other additives$^{e)}$ | phr | 9 | 9 | 9 | 9 | 9 | 9 | 9 |
| Accelerator$^{f)}$ | phr | 3.6 | 3.6 | 3.6 | 3.6 | 3.6 | 3.6 | 3.6 |
| Sulfur | phr | 2 | 2 | 2 | 2 | 2 | 2 | 2 |
| Properties | | | | | | | | |
| S50 | MPa | 1.1 | 1.2 | 1.2 | 1.4 | 1.5 | 1.9 | 1.8 |
| S100 | MPa | 1.9 | 1.9 | 2.0 | 2.3 | 2.6 | 3.1 | 3.0 |
| S200 | MPa | 3.9 | 4.0 | 4.2 | 4.7 | 5.8 | 6.3 | 6.1 |
| S300 | MPa | 6.3 | 6.6 | 7.0 | 7.6 | 9.6 | 10.1 | 9.7 |
| S400 | MPa | 9.0 | 9.2 | 9.9 | 10.8 | 13.4 | 13.8 | 13.3 |
| E' (6%) | MPa | 8.5 | 9.5 | 8.3 | 10.1 | 10.5 | 11.6 | 10.9 |
| E' (0.15%) | MPa | 17.0 | 18.7 | 16.0 | 21.5 | 21.6 | 24.9 | 29.8 |
| Hardness RT | Sh A | 71.4 | 71.9 | 71.5 | 75 | 77.9 | 79 | 79.7 |
| Rebound resilience % RT | | 17.4 | | 17.4 | 18 | 15.8 | 16.6 | 15.8 | 25.4 |

The invention claimed is:

1. A silane of formula I):

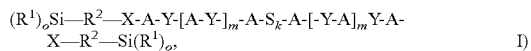

$(R^1)_oSi—R^2—X-A-Y-[A-Y-]_m-A-S_k-A-[-Y-A]_mY-A-X—R^2—Si(R^1)_o$,    I)

wherein o may be 1, 2 or 3 and k is an integer greater than or equal to 2 and the radicals $R^1$ within the silyl groups $(R^1)_oSi—$ and on both sides of the molecule may be identical or different from each other and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides or alkyl polyether groups —O—$(R^6$—O$)_r$—$R^5$ wherein $R^6$ are identical or different and are branched or unbranched, saturated or unsaturated, aliphatic, aromatic or mixed aliphatic/aromatic divalent $C_1$-$C_{30}$ hydrocarbon groups, preferably —$CH_2$—$CH_2$—, r is an integer from 1 to 30, preferably 3 to 10, and $R^5$ are unsubstituted or substituted, branched or unbranched, monovalent alkyl, alkenyl, aryl or aralkyl groups, preferably —$C_{13}H_{27}$ alkyl group or two $R^1$ form a cyclic dialkoxy group having 2 to 10 carbon atoms, in which case o is <3, or two or more silanes of formula I) can be bridged via radicals $R^1$; and wherein the radicals $R^2$ within a molecule may be identical or different and are linear or branched alkyl groups having 1 to 20 carbon atoms or cycloalkyl groups having 4 to 12 carbon atoms or aryl groups having 6 to 20 carbon atoms or alkenyl groups having 2 to 20 carbon atoms, alkynyl groups having 2 to 20 carbon atoms or aralkyl groups having 7 to 20 carbon atoms; and wherein the groups X within a molecule may be identical or different from each other and are selected from the groups:

—HNC(=O)—, —C(=O)NH—, —C(=O)O—, —OC(=O)—, —OC(=O)NH—, —HNC(=O)O—, —$R^3$NC(=O)NR$^3$—, —$R^3$NC(=NR$^3$)NR$^3$—, —$R^3$NC(=S)NR$^3$—, wherein the radicals $R^3$ within a group X and within a molecule may be identical or different and are selected from a hydrogen atom or as defined for $R^2$ under the condition that at least one $R^3$ within each group X is a hydrogen atom; and wherein the groups A within a molecule may be identical or different from each other and are aromatic groups; and, wherein the groups Y within a molecule may be identical or different from each other and are selected from the groups:

—HNC(=O)—, —C(=O)NH—, —C(=O)O—, —OC(=O)—, —OC(=O)NH—, —HNC(=O)O—, —$R^4$NC(=O)NR$^4$—, —$R^4$NC(=NR$^4$)NR$^4$—, —$R^4$NC(=S)NR$^4$—, wherein the radicals $R^4$ within a group Y and within a molecule may be identical or different and are selected from a hydrogen atom or as defined for $R^2$ under the condition that at least one $R^4$ within each group Y is a hydrogen atom; and wherein each m is independently an integer from 0 to 4, and wherein the silane may also be in the form of oligomers that are formed by hydrolysis and condensation of silanes of formula I).

2. The silane as claimed in claim 1, wherein each m=0.

3. The silane as claimed in claim 1, wherein the groups X are selected from the groups —HNC(=O)—, —C(=O)NH—, —OC(=O)NH—, —HNC(=O)O—, —$R^3$NC(=O)NR$^3$—, —$R^3$NC(=NR$^3$)NR$^3$—, and —$R^3$NC(=S)NR$^3$—.

4. The silane as claimed in claim 1, wherein the groups Y are selected from the groups —HNC(=O)—, —C(=O)NH—, —OC(=O)NH—, —HNC(=O)O—, —$R^4$NC(=O)NR$^4$—, —$R^4$NC(=NR$^4$)NR$^4$—, and —$R^4$NC(=S)NR$^4$—.

5. The silane as claimed in claim 1, wherein the aromatic groups A are selected from the group consisting of phenyl, naphthyl, pyridyl, pyridazyl, pyrimidyl, pyrazyl, triazyl, quinolyl, pyrrole, furan, thiophene, pyrazole, imidazole, thiazole and oxazole radicals.

6. The silane as claimed in claim 1, wherein the radicals $R^1$ are alkyl groups having 1 to 6 carbon atoms or alkoxy groups having 1 to 6 carbon atoms or halides.

7. The silane as claimed in claim 1, wherein the radicals $R^2$ are linear or branched alkyl groups having 2 to 8 carbon atoms or cycloalkyl groups having 4 to 8 carbon atoms.

8. The silane as claimed in claim 1, wherein the silane has the following formula II):

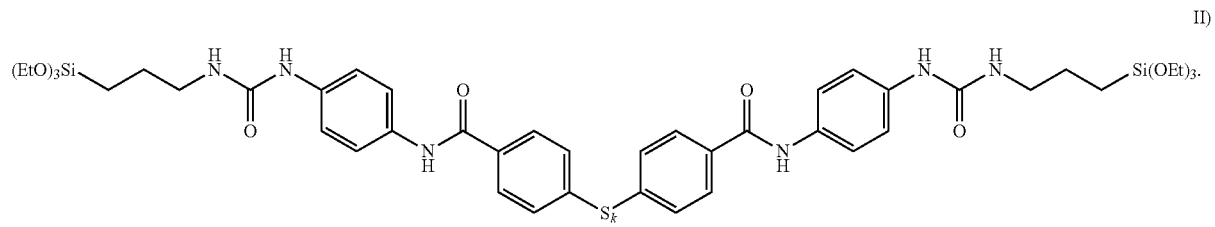

9. The silane as claimed in claim 1, wherein the silane has the following formula III):

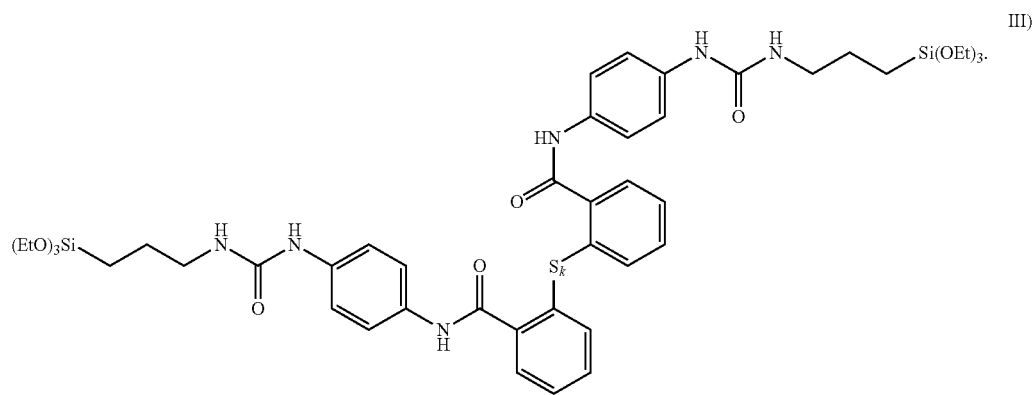

10. The silane as claimed in claim 1, wherein k is an integer from 2 to 8.

11. A rubber mixture comprising at least the silane as claimed in claim 1.

12. A vehicle tire comprising the rubber mixture as claimed in claim 11 at least one component.

\* \* \* \* \*